3,013,026
PROCESS FOR THE PREPARATION OF 3-KETO-Δ⁴-20-ALKYLAMINO STEROIDS
Vlasios Georgian, Evanston, and Arthur Magnani, Wilmette, Ill., assignors to The Julian Laboratories, Inc., Franklin Park, Ill., a corporation of Illinois
No Drawing. Filed Sept. 6, 1960, Ser. No. 53,876
12 Claims. (Cl. 260—397.3)

This invention relates to a novel process for the preparation of 3-keto-Δ⁴-20-alkylamino steroid derivatives. The 20-alkylamino compounds prepared by the process of this invention are useful as intermediates in the preparation of other steroid derivatives which have valuable therapeutic activity.

More specifically, the 3-keto-Δ⁴-20-alkylamino steroids prepared by the process of this invention are useful as intermediates in preparing corresponding 3-keto-Δ⁴-17,18-steroidal lactones which are converted into 18-oxygenated steroids. These latter 18-oxygenated steroids having for example an 18-hydroxymethylene or formyl group, are useful as intermediates for the preparation of the hormone aldosterone and analogues thereof, and are prepared from the steroidal lactone intermediates as described in British Patent No. 805,604. Further the steroidal lactones are useful as intermediates in the preparation of 11-dehydrocorticosterone derivatives as described in U.S. Patents #2,847,425 and #2,847,412.

The process of this invention for the preparation of 3-keto-Δ⁴-20-alkylamino steroids is schematically represented as follows:

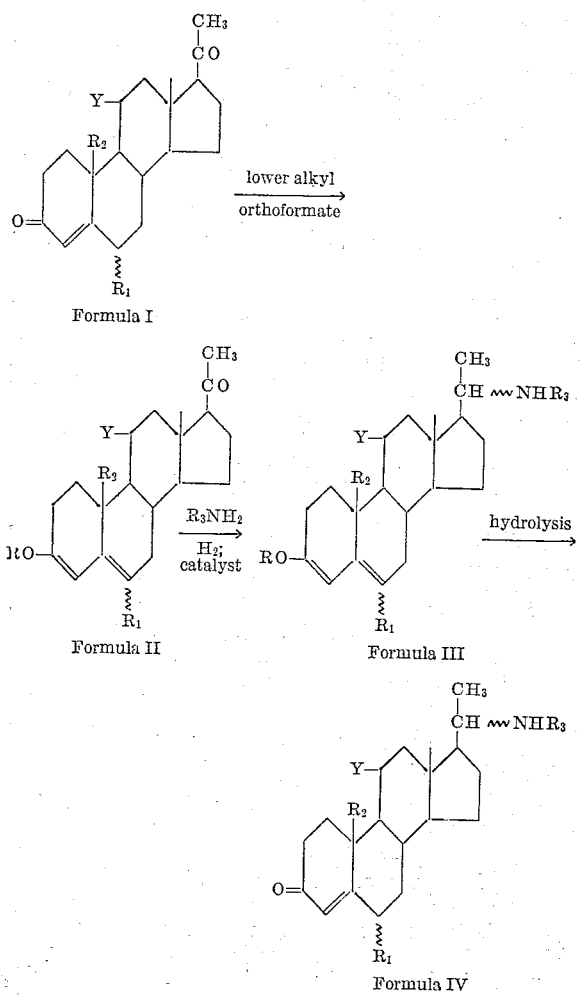

when:
$\xi$ represents an $\alpha$ or $\beta$ configurational position;
R represents lower alkyl of from 1 to 3 carbon atoms, preferably ethyl;
$R_1$ represents hydrogen, fluoro or methyl;
$R_2$ represents hydrogen or methyl;
Y represents hydrogen or keto; and
$R_3$ represents lower alkyl of from 1 to 4 carbon atoms.

In accordance with the novel process of this invention as shown above, the progesterone starting material of Formula I is converted to the corresponding enol lower alkyl ether of Formula II. Advantageously the progesterone derivative and a lower alkyl orthoformate, preferably ethyl orthoformate are dissolved or suspended in an unreactive organic solvent such as dioxane or a lower alkanol having from 1 to 4 carbon atoms, for example methanol or ethanol, and an acid catalyst is added such as an organic acid, for example p-toluenesulfonic acid or an inorganic acid, for example hydrogen chloride. The solution is allowed to stand at ambient room temperature or about 25° C. for from 1 to 3 hours. To isolate the enol ether, the reaction solution is neutralized with for example dilute sodium bicarbonate solution and extracted with for example methylene chloride.

The enol ether derivative thus prepared is hydrogenated in the presence of a primary lower alkyl amine having from 1 to 6 carbon atoms and a hydrogenation catalyst. Advantageously, the enol ether of Formula II is dissolved in an unreactive organic solvent such as dioxane or preferably a lower alkanol having from 1 to 4 carbon atoms, for example methanol or ethanol and the lower alkyl amine is added either as a gas or dissolved in a similar unreactive organic solvent. The solution is allowed to stand for from 2 to 5 hours and then shaken with the hydrogenation catalyst at a low pressure of hydrogen such as from about 1 to 5 atmospheres at a temperature in the range of from about ambient room temperature or about 25° C. to about 50° C. until the theoretical amount of hydrogen is absorbed, i.e. one molar equivalent. In carrying out this step, advantageously an excess of the lower alkylamine is employed, for example from 5 to 20 moles excess and preferably methylamine. Exemplary of suitable hydrogenation catalysts are the group of platinum and nickel catalysts, for example platinum oxide or Raney nickel, used in an amount of from about 1 to 20% by weight of the enol ether. The preferred catalyst is platinum oxide.

The lower alkylamino steroid is isolated from the reaction mixture by filtering off the catalyst and evaporating the filtrate to dryness. The residue comprises the crude 20α- and 20β-alkylamines of Formula III and is advantageously used directly in the ensuing hydrolysis step.

The 20-alkylamino steroid of Formula III thus prepared is then hydrolyzed with mineral acid such as hydrochloric acid or sulfuric acid to give the 3-keto-Δ⁴-20-alkylamino steroid of Formula IV. Advantageously, the enol ether amine III is dissolved in aqueous hydrochloric acid for example of 10% solution, and allowed to stand at ambient or room temperature, about 25° C. for from 4 to 24 hours or warmed to a temperature in the range of from about 35° C. to 95° C. The non-amine fraction is removed and the remaining solution is made basic with for example an aqueous solution of an alkali metal hydroxide such as sodium hydroxide solution. The amine fraction oils out and either gradually crystallizes or is extracted and the extract evaporated to give a solid residue of 20α- and 20β-alkylamino steroids. If desired, the solid amine is further purified and then fractionally recrystallized to give the 20α- and 20β-alkylamino steroids.

It is obvious from the above description that the novel process of this invention affords a rapid and simple route for the preparation of 3-keto-Δ⁴-20-alkylamino steroids in good yields. The progesterone starting materials are known or readily available. It will be obvious to one skilled in the art that other substituted progesterone derivatives than those described above similarly can be employed in this novel process. For example, 9α-fluoro-, 16α-hydroxy, 16α-methyl and 6β-hydroxy-substituted progesterones can be employed to give the corresponding 20-alkylamines.

The 3-keto-Δ⁴-20-alkylamino steroids prepared by the novel process of this invention are useful as intermediates in the preparation of 17,18-steroidal lactones. The following reaction sequence will serve to illustrate this utility.

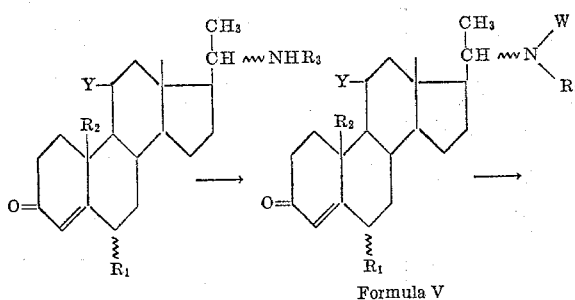

Formula V

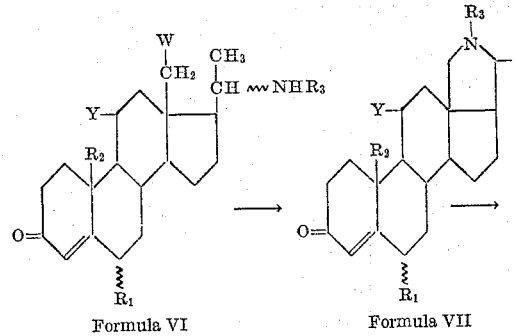

Formula VI     Formula VII

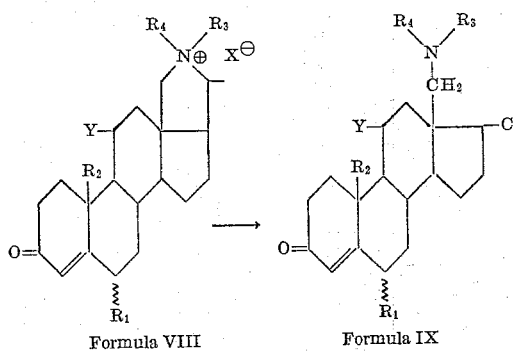

Formula VIII     Formula IX

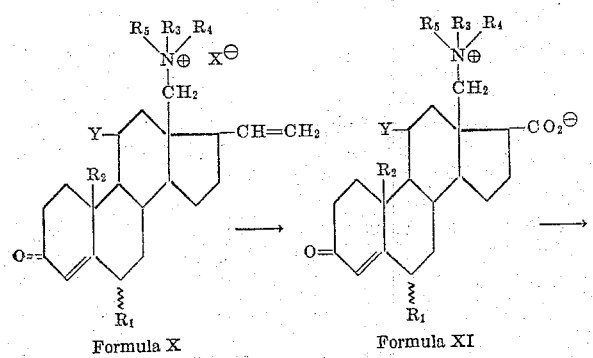

Formula X     Formula XI

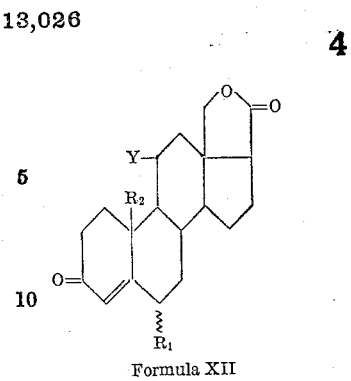

Formula XII when:

$\xi$ is an α or β configurational position;

W represents halogen of atomic weight less than 80, such as chlorine or bromine;

X represents an anion, preferably an inorganic anion such as hydroxyl, methosulfate, chloride, iodide or bromide, which forms a stable quaternary salt;

Y represents hydrogen or keto;

$R_3$, $R_4$ and $R_5$ represent lower alkyl;

$R_1$ represents hydrogen, fluoro or methyl; and $R_2$ represents hydrogen or methyl.

As outlined above, the 3-keto-Δ⁴-20-alkylamino steroid is treated with a halogenating agent such as for example N-chlorosuccinimide, hypochlorous acid, sodium hypobromite or preferably sodium hypochlorite, to give the 3-keto-Δ⁴-20-(N-alkyl-N-haloamino) steroid of Formula V. The N-haloamine is dissolved in trifluoroacetic acid and irradiated with ultraviolet light until titration for residual N-haloamine indicates the reaction is complete.

The trifluoroacetic acid is then removed by evaporation in vacuo and the residual 3-keto-Δ⁴-18-halo steroid intermediate represented by Formula VI above is reacted with an alkali metal hydroxide, such as potassium or sodium hydroxide to give the ring closed conanine derivative of Formula VII.

The 3-keto-Δ⁴-conanine thus prepared is converted into the quaternary derivatives of Formula VIII, usually with a reactive alkyl halide, such as a lower alkyl iodide, preferably the methyl iodide. This quaternary salt is then converted to the quaternary ammonium hydroxide by exchanging the anion or halide portion with the hydroxyl form of an anion exchange resin prepared by passing 10% sodium hydroxide over the quaternary halide until the halide ion is exhausted. Exemplary of the resins (halide form) which can be used are the preferred Amberlite IRA–400, as well as Amberlite IRA–401, Amberlite IRA–410, Amberlite IRA–411, Dowex 1, Dowex 2, Imac S–3 and others. Full descriptions of these resins, including what is known of their sources and chemical characteristics are found in "Ion Exchange Resins" by Kunin, 2nd edition, John Wiley, pages 89–96 and "Ion Exchangers in Organic and Biochemistry" by Calmon and Kressman, Interscience, pages 116–129. Exemplary of the preparation of the anion exchange resins used are those disclosed by U.S. Patents No. 2,591,573, No. 2,689,833, No. 2,689,832 and No. 2,725,361, particularly those of the example of No. 2,591,573 and Example 1 of No. 2,689,833.

The chemical structures of the anion exchange resins detailed above can vary widely. The anion exchange resins may be considered as insoluble, high molecular weight electrolytes. The resin must be sufficiently crossed linked to have negligible solubility, sufficiently hydrophilic to permit diffusion of ions through the structure at a finite and usable rate and chemically stable. The most useful are the strongly basic exchangers of a type 1 resin containing —NMe₃⊕ groups which have a skeleton derived from a monomer of p-trimethylaminomethylphenylethylene. Otherwise stated, these resins are the hydroxide forms of styrene-type quaternary salts.

The preferred manner of reaction is to pass the quaternary steroid in alcoholic solution over the hydroxide form of the resin in a typical column form, washing the resin with more solvent until the eluate is neutral. The alcohol is then evaporated to leave the steroidal quaternary hydroxide of Formula VIII when $X^\ominus$ is $OH^\ominus$.

The 3-keto-$\Delta^4$-steroidal quaternary hydroxide is then heated, preferably under vacuum, until the effervescence ceases. Preferred conditions are at about 180° C. under about 10–50 mm. pressure for from 10 minutes to about one hour. The residue is then the crude 18-dialkylamino-$\Delta^{4;20}$-steroid of Formula IX.

This tertiary amine is quaternized to the compounds of Formula X by reaction with a reactive lower alkyl halide in an organic, usually highly polar, solvent in which the reactants are substantially soluble and nonreactive, such as acetonitrile, ethanol, methanol, benzene, dimethylformamide or dimethylacetamide, at temperatures of from about 50–150° C. for 1 to 24 hours, preferably in acetonitrile at reflux. The resulting quaternary salt is converted to the hydroxide by passing over the hydroxide form of an anion exchange resin as outlined hereabove for the preparation of the quaternary hydroxides of Formula VIII, $X^\ominus$ being $OH^\ominus$.

The resulting quaternary hydroxide of Formula X, X , is then oxidized at about room temperature with permanganate, such as potassium permanganate, either in the preferred water vehicle or in a water-aqueous miscible solvent not subject to oxidation in which the reactants are substantially soluble. Alternatively, the following oxidation conditions can be employed. A solution of the quaternary hydroxide in water is treated with ozone until ozone uptake is ended. The resulting solution is treated with 30% hydrogen peroxide for about 18 hours, the excess hydrogen peroxide is decomposed with palladium catalyst and the filtered solution is evaporated to yield the desired betaine. Alternatively, other oxidizing agents known to oxidize terminal double bonds, such as chromic acid, are used.

The oxidation product is an inner or intramolecular quaternary salt or a betaine of the 18-trialkylamino-17-carboxylates of Formula XI. This compound is dissolved in an organic solvent in which it is substantially soluble and which is nonreactive with it and with alkali. N,N-dimethylformamide and N,N-dimethylacetamide, or aqueous mixtures thereof, are the preferred and advantageous solvents. The reaction mixture at a basic pH, preferably from about 8 to 14, advantageously about 10 to 13, is heated preferably at from about 50–150° C. but not above the boiling point of the solvent, advantageously from about 75–120° C. until the intramolecular displacement of the quaternary ammonium group is complete, usually from about one to eight hours. The basic conditions can be induced by any suitable base, such as the alkali metal hydroxides or alkoxides particularly sodium or potassium hydroxide or methoxide. Actually the alkali metal salt of the hydroxy carboxylic acid intermediate is transiently formed which is not isolated but transformed directly into the lactone by a neutralization reaction, such as treatment with conventional acid reaction such as with hydrochloric acid, acetic acid, sulfuric acid, etc. The reaction product is the 3-keto-$\Delta^4$-17,18-lactones of Formula XII which have utility as intermediates as described herein.

The following examples will serve to illustrate the novel process of this invention and the utility of 3-keto-$\Delta^4$-20-alkylamino steroids as intermediates in the preparation of the 3-keto-$\Delta^4$-17,18-lactones which are valuable intermediates for the preparation of 18-oxygenated aldosterone and 11-dehydrocorticosterone derivatives. As illustrative examples the following are not intended to limit the scope of this invention since obvious alternatives to the methods disclosed herein are likewise within the purview of this invention.

*Example 1*

To a stirred mixture of 20.0 g. of 11-ketoprogesterone, 30 ml. of dioxane and 20 ml. of ethyl orthoformate is added a solution of 0.3 g. of p-toluenesulfonic acid in 0.2 ml. of ethanol and 3.0 ml. of dioxane. After solution is complete, the reaction mixture is allowed to stand for one hour. Sodium bicarbonate solution is then added and the solution is extracted with methylene chloride. The extract is washed with water containing pyridine (1 ml./l). Pyridine (0.1 ml.) is added to the extract and then evaporated to dryness to give the 3-enol ethyl ether of 11-ketoprogesterone.

The enol ether thus prepared (21.0 g.) is dissolved in 250 ml. of ethanol and 21.0 g. of methylamine is passed into the solution, with cooling. The solution is allowed to stand for 2–3 hours. Platinum oxide (1.5 g.) is added and the mixture shaken with hydrogen or a Parr apparatus until one mole of hydrogen is absorbed. The reaction mixture is filtered and the filtrate concentrated in vacuo to give the residual 3-ethoxy-11-keto-20-methylamino-3,5-pregnadiene. To this residue is added 10 ml. of concentrated hydrochloric acid and 90 ml. of water and the solution warmed. After standing at room temperature for 30 mintues, 100 ml. of water is added and the solution warmed and allowed to stand. The nonamine fraction is filtered and the filtrate made alkaline and extracted with methylene chloride. The extract is washed with water and evaporated to dryness. The residue is dissolved in ether/methylene chloride, treated with charcoal, filtered and concentrated to give 3,11-diketo-20-methylamino-4-pregnene which melts at 158–160° C. upon crystallization from ether/petroleum ether.

*Example 2*

To a mixture of 32.0 g. of progesterone, 45 ml. of dioxane and 30 ml. of ethyl orthoformate is added a solution of 0.45 g. of p-toluenesulfonic acid in 0.3 ml. of ethanol and 5 ml. of dioxane. Workup of the reaction mixture as in Example 1 yields the 3-enol ethyl ether of progesterone. The enol ether thus prepared is dissolved in 300 ml. of ethanol, 22.0 g. of methylamine is added and the solution allowed to stand for three hours. Platinum oxide (3.0 g.) is added and the mixture shaken under hydrogen on a Parr apparatus with warming until approximately one mole of hydrogen is absorbed. The catalyst is filtered off and the filtrate evaporated in vacuo. The residual 3-ethoxy-20-methylamino-3,5-pregnadiene is treated with hydrochloric acid and water, and allowed to stand for 18 hours. The non-basic insoluble material is filtered off and the filtrate made basic with 40% sodium hydroxide solution. The oil which first separates solidifies and is filtered off. The solid is water-washed, taken up in methylene chloride and ether, brine washed to neutral, dried and concentrated. Ether is added to precipitate a solid which is filtered off and recrystallized by dissolving in hot acetone and a minimum of methanol and chilling to give 3-ketone-20α-methylamino-4-pregnene. The filtrate is evaporated and the residue recrystallized from acetone to give 3-keto-20β-methylamino-4-pregnene.

*Example 3*

A mixture of 30.0 g. of 19-norprogesterone, 40 ml. of dioxane and 33 ml. of ethyl orthoformate is treated with a solution of 0.4 g. of p-toluenesulfonic acid dissolved in 0.3 ml. of ethanol and 4.0 ml. of dioxane. Workup of the reaction mixture as in Example 1 gives the 3-enol ethyl ether of 19-norprogesterone. The enol ether is then dissolved in 300 ml. of ethanol and 20.0 g. of methylamine is added. After allowing this solution to stand for two hours, 2.8 g. of platinum oxide is added and the mixture shaken under hydrogen on the Parr apparatus until one mole of hydrogen is absorbed. The catalyst is removed and the solution evaporated to give the residual 3-ethoxy-20-methylamino-19-nor-3,5-pregnadiene. This residue is hydrolyzed with approximately 10% hydrochloric acid solution as described in Example 1 and similarly worked up to give the product, 3-keto-20-methylamino-19-nor-4-pregnene.

Example 4

To a mixture of 16.6 g. of 6α-fluoroprogesterone, 30 ml. of dioxane and 16.5 ml. of ethyl orthoformate is added a solution of 0.25 ml. of p-toluenesulfonic acid in 0.2 ml. of ethanol and 3.0 ml. of dioxane. Workup of the reaction mixture as in Example 1 gives the 3-enol ethyl ether of 6α-fluoroprogesterone. This enol ether is dissolved in 200 ml. of ethanol, 20.0 g. of methylamine is added and the solution is allowed to stand for two hours. Platinum oxide (1.2 g.) is added and the mixture shaken under hydrogen on the Parr apparatus until one mole of hydrogen is absorbed. The catalyst is removed by filtration and the filtrate evaporated to give 3-ethoxy-6α-fluoro-20-methylamino-3,5-pregnadiene. This diene is treated with aqueous hydrochloric acid as described in Example 1 to yield the product, 3-keto-6α-fluoro-20-methylamino-4-pregnene.

Similarly, by substituting in the above reaction 16.6 g. of 6β-fluoroprogesterone or 17.3 g. of 6α- or 6β-fluoro-11-ketoprogesterone there is obtained the corresponding 20-methylamino-4-pregnenes.

Example 5

A mixture of 20.0 g. of 6α-methylprogesterone, 30 ml. of dioxane and 20 ml. of ethyl orthoformate is treated with a solution of 0.3 g. of p-toluenesulfonic acid in 0.2 ml. of ethanol and 3.0 ml. of dioxane. After standing for one hour the reaction mixture is worked up as described in Example 1 to yield the 3-enol ethyl ether of 6α-methylprogesterone. This enol ether (21.0 g.) is dissolved in 250 ml. of ethanol and a solution of 40.0 g. of butylamine in 250 ml. of ethanol is added. After standing for three hours 1.5 g. of platinum oxide is added and the mixture hydrogenated on the Parr apparatus until one mole of hydrogen is absorbed. The catalyst is removed the solution evaporated to give 3-ethoxy-6α-methyl-20-butylamino-3,5-pregnadiene. Acid treatment of this diene as described in Example 1 yields the product, 3-keto-6α-methyl-20-butylamino-4-pregnene.

Example 6

An anhydrous solution of 12.0 g. of 3β-hydroxy-19-nor-5-pregnen-20-one in 250 ml. of benzene and 20 ml. of ethylene glycol is treated with 0.3 g. of p-toluenesulfonic acid monohydrate and then refluxed for four hours with continuous removal of water formed in the reaction. The reaction mixture is washed with sodium bicarbonate solution and water, dried and the solvent removed to give 20,20-ethylenedioxy-3β-hydroxy-19-nor-5-pregnene.

A solution of the above ethylenedioxy derivative (8.7 g.) in 100 ml. of chloroform is treated with 6.8 g. of monoperphthalic acid in 170 ml. of ether. After standing 12 hours at 0° C. the reaction mixture is diluted with an equal volume of ether and washed with aqueous potassium carbonate and water until neutral. The dried solution is evaporated to give 20,20-ethylenedioxy-5α,6α-epoxy-3β-hydroxy-19-norallopregnane.

The epoxide prepared as above (5.1 g.) in a mixture of 125 ml. of dry benzene and 200 ml. of ether is added to a solution of methyl magnesium iodide prepared from 3.0 g. of magnesium and 8.0 ml. of methyl iodide in 50 ml. of ether. The mixture is stirred at room temperature for six hours, allowed to stand for 12 hours and then poured into an excess of aqueous ammonium chloride. The organic layer is washed, dried and evaporated. The residue is dissolved in 125 ml. of 90% methanol and 2 g. of oxalic acid is added. The mixture is refluxed for 30 minutes and then concentrated to give 3β,5α-dihydroxy-6β-methyl-19-norallopregnan-20-one.

A solution of 5.0 g. of the norpregnanone is oxidized with 15.0 g. of aluminum isopropoxide in 100 ml. of toluene and 100 ml. of cyclohexanone at reflux temperature for two hours according to the Oppenauer process to give 6β-methyl-19-norprogesterone.

A mixture of 32.0 g. of 6β-methyl-19-norprogesterone, 45 ml. of dioxane and 30 ml. of ethyl orthoformate is treated with a solution of 0.45 g. of p-toluenesulfonic acid in 0.3 ml. of ethanol and 5 ml. of dioxane. Working up as described in Example 1 yields the 3-enol ethyl ether of 6β-methyl-19-norprogesterone. This enol ether is dissolved in ethanol and 22.0 g. of methylamine is added. After standing for two hours, 3.0 g. of platinum oxide is added and the mixture hydrogenated on the Parr apparatus until one mole of hydrogen is absorbed. Removal of the catalyst and evaporation yields 3-ethoxy-6β-methyl-20-methylamino-19-nor-3,5-pregnadiene. Acid hydrolysis of the diene as described in Example 1 yields 3-keto-6β-methyl-20-methylamino-19-nor-4-pregnene.

Example 7

A solution of 6.0 g. of 3,11-diketo-20-methylamino-4-pregnene (prepared as in Example 1) in 100 ml. of methylene chloride is treated twice with 250 ml. of 5% sodium hypochlorite solution for 15 minute periods, with stirring. The organic layer is washed with water, dried and evaporated to give 3,11-diketo-20-(N-methyl-N- chloroamino)-4-pregnene.

This chloroamine is dissolved in 75 ml. of cold trifluoroacetic acid and subjected to ultraviolet irradiation under nitrogen atmosphere for 35 minutes. The trifluoroacetic acid is evaporated under reduced pressure and the residual 18-chloro-3,11-diketo-20-methylamino-4-pregnene is dissolved in 25 ml. of methanol. The solution is treated with 25% methanolic potassium hydroxide solution to raise the pH to 10–11.5. The basic solution is then refluxed for one hour, concentrated and poured into 100 ml. of water. The aqueous solution is extracted with methylene chloride and the extract water washed and dried. The extract is evaporated and heated on the steam bath for two hours with 7.0 ml. of acetic anhydride to convert any secondary amine to the amide. The mixture is poured into about 200 ml. of water, filtered and the filtrate made basic with 40% sodium hydroxide solution. The oil is extracted into methylene chloride, water washed, dried and evaporated to give 3,11-diketo-$\Delta^4$-conanine.

A solution of 7.0 g. of 3-keto-$\Delta^4$-conanine and 9.6 ml. of methyl iodide in 50 ml. of benzene is heated at reflux for two hours. The mixture is cooled, diluted with ether and filtered to give 3,11-diketo-$\Delta^4$-conanine methiodide.

A solution of 1.0 g. of the methiodide dissolved in methanol is passed through 20.0 g. of Amberlite IRA–400 resin (hydroxide form). The resin column is washed with methanol until the eluate is neutral. The combined methanol solutions are evaporated to leave the quaternary hydroxide. This residue is heated at 180° C. under 15 mm. pressure until the bubbles cease to give 3,11-diketo-18-dimethylamino-4,20-pregnadiene.

A solution of 1.5 g. of the pregnadiene in 100 ml. of acetonitrile and 5 ml. of methyl iodide is refluxed for 20 hours, then evaporated to give 3,11-diketo-18-dimethylamino-4,20-pregnadiene methiodide. The salt is dissolved in methanol and passed over an Amberlite IRA–400 resin (hydroxide) column. The methanol eluate is evaporated to give the 3,11-diketo-18-trimethylammonium-4,20-pregnadiene hydroxide.

A solution of 4.0 g. of the quaternary hydroxide in 75 ml. of water is treated dropwise with a solution of 3.9 g. of potassium permanganate in 100 ml. of water at ambient temperature. The precipitated manganese dioxide is separated and the aqueous filtrate is evaporated to give the methyl 3,11-diketo-18-dimethylamino-4-etiocholenate, betaine. This compound is suspended in 100 ml. of dimethylformamide and adjusted to a pH of 12 with 10% sodium hydroxide solution. The mixture is heated under nitrogen on the steam bath for five hours, then evaporated to dryness in vacuo. An aqueous solution of the residue is treated with charcoal, filtered and made acid with concentrated hydrochloric acid. The resulting precipitate is extracted with ether and the ethereal solution evaporated to give 3,11-diketo-18-hydroxy-4-etiocholenic acid, γ-lactone.

*Example 8*

Following the procedure outlined in U.S. Patents 2,847,425 and 2,847,412, 3,11-diketo-18-hydroxy-4-etiocholenic acid, γ-lactone (prepared as in Example 7 of this application) is reacted with hydrazine to open the lactone ring thereby forming the corresponding hydrazide which on treatment with an excess of methane sulfonyl chloride and then desulfurization with deactivated Raney nickel is converted to 3,11-diketo-4-etiocholenic acid. This latter compound is converted to Kendall's compound A acetate by the classical diazoketone synthesis involving treatment of the diketo acid with oxalyl chloride followed by reaction of the acid chloride with diazomethane and acetic acid. Hydrolysis of the acetate gives Kendall's compound A, 11-dehydrocorticosterone, an adrenocortical hormone of use in the clinical treatment of disorders resulting from loss of adrenal function.

*Example 9*

Amberlite IRA–400 in the chloride form (100 g.) is packed into a glass chromatography column and 10% sodium hydroxide solution is passed through until the resin is free of chloride ion which is determined by assaying the eluate for chloride ion by acidification with nitric acid and addition of silver nitrate solution. When no silver chloride precipitates, the resin is free of chloride ion. The resin is then washed with distilled water until the washings are neutral. Further washing with methanol and air drying gives the Amberlite IRA–400 in the hydroxide form.

What is claimed is:

1. The method of forming 3-keto-$\Delta^4$-20-alkylamino steroids having the following formula:

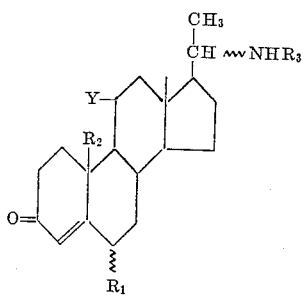

in which $\xi$ is a configurational position selected from the group consisting of $\alpha$ and $\beta$; $R_1$ is a member selected from the group consisting of hydrogen, fluoro and methyl; $R_2$ is a member selected from the group consisting of hydrogen and methyl; $R_3$ is lower alkyl of from 1 to 4 carbon atoms; and Y is a member selected from the group consisting of hydrogen and keto, which comprises reacting a progesterone derivative having the following formula:

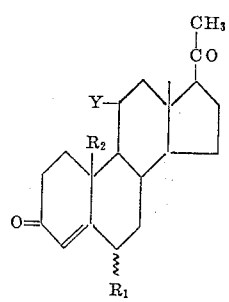

in which $\xi$, $R_1$, $R_2$ and Y are as defined above, with a lower alkyl orthoformate to form an enol ether having the following formula:

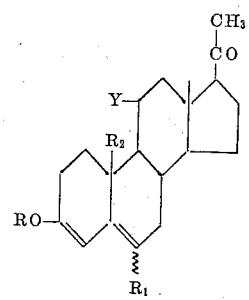

in which $\xi$, $R_1$, $R_2$ and Y are as defined above and R is lower alkyl of from 1 to 3 carbon atoms; hydrogenating said enol ether in the presence of a lower alkyl amine and a hydrogenation catalyst to form a 20-alkylamino-3,5-pregnadiene having the following formula:

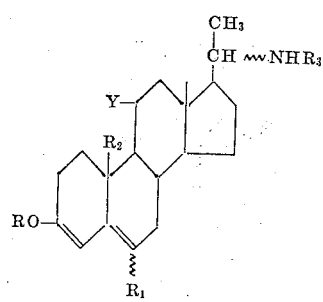

in which $\xi$, R, $R_1$, $R_2$, $R_3$ and Y are as defined above; and hydrolyzing said pregnadiene with mineral acid.

2. The method in accordance with claim 1 in which the lower alkyl orthoformate is ethyl orthoformate.
3. The method in accordance with claim 1 in which the lower alkylamine is methyl amine.
4. The method in accordance with claim 1 in which the hydrogenation catalyst is platinum oxide.
5. The method in accordance with claim 1 in which the mineral acid is hydrochloric acid.
6. The method of forming 3-keto-$\Delta^4$-20-alkylamino steroids having the following formula:

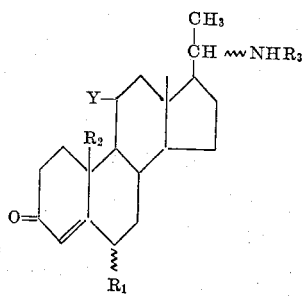

in which $\xi$ is a configurational position selected from the group consisting of $\alpha$ and $\beta$; $R_1$ is a member selected from the group consisting of hydrogen, fluoro and methyl; $R_2$ is a member selected from the group consisting of hydrogen and methyl; $R_3$ is lower alkyl of from 1 to 4 carbon atoms; and Y is a member selected from the group consisting of hydrogen and keto, which comprises hydrogenating in the presence of a lower alkyl amine and a hydrogenation catalyst a steroidal enol ether derivative having the following formula:

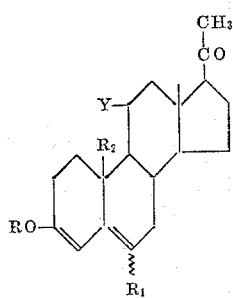

in which $\xi$, $R_1$, $R_2$ and Y are as defined above and R is lower alkyl of from 1 to 3 carbon atoms to form a 20-alkylamino-3,5-pregnadiene having the following formula:

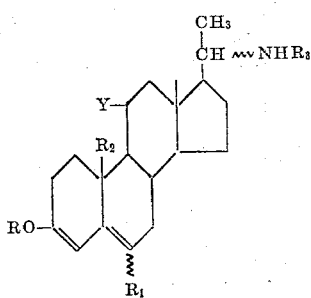

in which R, $R_1$, $R_2$, $R_3$ and Y are as defined above; and hydrolyzing said pregnadiene with mineral acid.

7. The method in accordance with claim 6 in which the steroidal enol ether derivative is a 3-enol ethyl ether.

8. The method in accordance with claim 6 in which the lower alkyl amine is methyl amine.

9. The method in accordance with claim 6 in which the hydrogenation catalyst is platinum oxide.

10. The method in accordance with claim 6 in which the mineral acid is hydrochloric acid.

11. The method of forming 3-keto-20β-methylamino-4-pregnene which comprises hydrogenating in the presence of methylamine and platinum oxide the 3-enol ethyl ether of progesterone to form 3-ethoxy-20-methylamino-3,5-pregnadiene and hydrolyzing said pregnadiene with hydrochloric acid.

12. The method of forming 3,11-diketo-20-methylamino-4-pregnene which comprises hydrogenating in the presence of methylamine and platinum oxide the 3-enol ethyl ether of 11-keto-progesterone to form 3-ethoxy-11-keto-20-methylamino-3,5-pregnadiene and hydrolyzing said pregnadiene with hydrochloric acid.

References Cited in the file of this patent

UNITED STATES PATENTS

| | | |
|---|---|---|
| 2,744,122 | Djerassi et al. | May 1, 1956 |
| 2,852,537 | Ringold et al. | Sept. 16, 1958 |
| 2,959,586 | Kerwin et al. | Nov. 8, 1960 |
| 2,960,503 | Weinstock et al. | Nov. 15, 1960 |

OTHER REFERENCES

Ercoli et al.: J. Am. Chem. Soc., vol. 82, pp. 746–748 (February 5, 1960).